United States Patent
Nakamura

[19]

[11] Patent Number: 6,141,233
[45] Date of Patent: Oct. 31, 2000

[54] RECTIFIER CIRCUIT DEVICE AND DC/DC CONVERTER PROVIDED WITH THE CIRCUIT DEVICE

[75] Inventor: Hidetake Nakamura, Tokyo, Japan

[73] Assignee: NEC Corporation, Tokyo, Japan

[21] Appl. No.: 09/382,639

[22] Filed: Aug. 25, 1999

[30] Foreign Application Priority Data

Aug. 28, 1998 [JP] Japan .................................. 10-242747

[51] Int. Cl.[7] .................................................. H02M 7/217
[52] U.S. Cl. .............................. 363/127; 363/89; 363/21
[58] Field of Search .................................. 363/81, 21, 52, 363/53, 89, 125, 127

[56] References Cited

U.S. PATENT DOCUMENTS

| | | | |
|---|---|---|---|
| 5,544,038 | 8/1996 | Fisher et al. | 363/127 X |
| 5,604,429 | 2/1997 | Nakashima | 363/126 X |
| 5,636,116 | 6/1997 | Milavec et al. | 363/127 X |

FOREIGN PATENT DOCUMENTS

| | | |
|---|---|---|
| 59-47753 | 3/1984 | Japan . |
| 63-58898 | 4/1988 | Japan . |
| 1-144663 | 6/1989 | Japan . |
| 5-29908 | 2/1993 | Japan . |
| 5-252737 | 9/1993 | Japan . |
| 6-343263 | 12/1994 | Japan . |
| 7-337005 | 12/1995 | Japan . |
| 9-56155 | 2/1997 | Japan . |
| 10-146047 | 5/1998 | Japan . |
| 10-146051 | 5/1998 | Japan . |

*Primary Examiner*—Jessica Han
*Attorney, Agent, or Firm*—Mcginn & Gibb, P.C.

[57] ABSTRACT

A rectifier circuit device wherein a FET element for rectification and a diode for reflux are provided inside of one package. In this rectifier circuit device, there are provided a first external connection terminal connected to a drain of the FET element, a second external connection terminal connected to a source of the FET element and an anode of the diode inside of the package, and a third external connection terminal connected to a gate of the FET element and a cathode of the diode inside of the package. The FET element and the diode are integrated on the same chip.

13 Claims, 6 Drawing Sheets

RECTIFIER CIRCUIT DEVICE AND DC/DC CONVERTER PROVIDED WITH THE CIRCUIT DEVICE

BACKGROUND OF THE INVENTION

1. Field of the Invention

The present invention relates to a rectifier circuit device used for a power source circuit or the like and a DC/DC converter provided with the rectifier circuit device, and more particularly to a rectifier circuit device and a DC/DC converter provided with which an attempt is made to reduce the size thereof.

2. Description of the Related Art

Conditions which are required of a power source circuit include improvement in efficiency of the circuit and reduction in the size thereof. Generally, the rectifier circuit device has been composed only of diodes, but a method of using a field effect transistors (FET) as an element for rectification has been developed and is known.

FIG. 1 is a block diagram showing a structure of a conventional DC/DC converter in which a rectifier circuit device is composed only of diodes. Hereinafter, this conventional DC/DC converter is referred to as a first conventional example.

In the first conventional example, a switching element 101 and a controlling circuit 100 therefor are provided on the primary side of a transformer 102. Furthermore, a rectifier circuit device 103a and a smoothing circuit 104 are provided on the secondary side of the transformer 102.

In the rectifier circuit device 103a, two diodes 105 and 106, and a first to a third external connection terminals 111 to 113 are provided. The anode of the diode 105 is connected to the first external connection terminal 111. The anode of the diode 106 is connected to the second external connection terminal 112. The cathodes of the diodes 105 and 106 are connected to the third external connection terminal 113. Then, the first external connection terminal 111 is connected to a negative pole of the transformer 102 and the smoothing circuit. The second external connection terminal 112 is connected to the positive pole of the transformer 102. The third external connection terminal 113 is connected to the smoothing circuit.

In the first conventional example thus configured, parts which incorporate two diode elements exist with the result that one part can constitute the rectifier circuit. However, the first conventional example cannot sufficiently attain improvement in the efficiency of the device and reduction in size thereof.

Then, as described above, a method has been developed, wherein an FET is used as an element for rectification. FIG. 2 is a block diagram showing a structure of a conventional DC/DC converter in which the rectifier circuit device is provided with a FET for rectification and a diode for reflux. Hereinafter, this conventional DC/DC converter is referred to as a second conventional example. Incidentally, in the second conventional example shown in FIG. 2, the same constitution elements as the first conventional example shown in FIG. 1 are denoted by the same reference numerals, and a detailed explanation thereof will be omitted.

In the second conventional example, a rectifier circuit portion 103b is connected between the secondary side of the transformer 102 and the smoothing circuit 104. In the rectifier circuit portion 103b, a diode 105 and an FET element 107 are provided. The drain of the FET element 107 is connected to the negative pole of the transformer 102. The gate of the FET element 107 is connected to the positive pole of the transformer 102 and the smoothing circuit 104. Then, the source of the FET element 107 is connected to the smoothing circuit 104. On the other hand, the cathode of the diode 105 is connected to the positive pole of the transformer 102 and the smoothing circuit 104 while the anode of the diode 105 is connected to the source of the FET element 107 and the smoothing circuit 104. Incidentally, the diode 105 and the FET element 107 are different parts.

In this manner, in accordance with the second conventional example which is constituted with the combination of the FET element and the diode e, it is possible to improve the efficiency of the power source.

However, the number of the parts which constitute the rectifier circuit portion increases, and the circuit becomes complicated. As a consequence, there arise problems in terms of the reduction in the size of the DC/DC converter and the reduction in the cost thereof.

Furthermore, in the case where the FET element is used in the rectifier circuit portion, the rectifier circuit portion is composed of two parts, one part for rectification and the other for reflux. Then, wiring is required to be provided on the printed board. Therefore, this becomes a factor which hinders attempts of the simplification of the wiring on the printed board and of improvement in the packaging efficiency thereof.

There have been disclosed a converters or the like (Japanese Patent Application Laid-Open No. Hei 6-343263, No. Sho 59-47753, No. Hei 1-144663, No. Hei 5-29908 and No. Hei 10-146047).

According to a converter disclosed in Japanese Patent Application Laid-Open No. Hei 6-343263, an FET element is provided on the secondary side of a transformer for rectification. However, as described above, there are problems in terms of the reduction in the size of the DC/DC converter and the reduction in the cost thereof.

According to a semiconductor device disclosed in Japanese Patent Application Laid-Open No. Sho 59-47753, an FET containing GaAs semiconductor and a Si diode for protection are packaged in a small package. However, the FET containing GaAs semiconductor and the Si diode can not be integrated on the same chip.

According to a composite semiconductor device disclosed in Japanese Patent Application Laid-Open No. Hei 1-144663, a power MOSFET and a diode are merely in the same container to make one package.

In Japanese Patent Application Laid-Open No. Hei 5-29908, there is disclosed only a minimized semiconductor relay, which has a photocoupler, a FET element, and four external terminals.

According to a DC/DC converter in Japanese Patent Application Laid-Open No. Hei 10-146047, a semiconductor device is provided on a wiring substrate. In the semiconductor device, a first switching means for controlling ON/OFF of a DC input power source, a second switching means for turning OFF/ON in synchronous with the first switching means (MOSFET including an internal diode and a Schottky barrier diode connected to the internal diode in parallel), and a synchronous controlling means are merely packaged in one body.

Furthermore, there is disclosed an FET rectifying circuit (Japanese Utility Model Application Laid-Open No. Sho 63-58898). The Application relates to a rectifying circuit in which an AC voltage for control is applied to the point between the gate and the source of an FET, and an AC voltage for rectification is rectified through a source-drain circuit of the FET. The FET rectifying circuit is provided with a Zener diode and a resistance. The Zener diode is connected to the gate-source circuit in series so that the polarity of the Zener diode is one in which the AC voltage for control of polarity on the conductive side of the FET is prevented. The resistance is provided in parallel the gate-source circuit.

However, these semiconductor devices can not improve the efficiency of the power source and the like.

SUMMARY OF THE INVENTION

An object of the present invention is to provide a rectifier circuit device and a DC/DC converter provided with the rectifier circuit device in which an efficiency of the power source can be improved, and at the same time, the size of the device can be reduced and the cost thereof can be lowered, and the wiring of the printed board can be simplified and the packaging efficiency thereof can be improved.

According to one aspect of the present invention, a rectifier circuit device may comprise a package, an FET element for rectification which is provided inside of the package, a diode for reflux which is provided inside of the package, a first external connection terminal connected to the drain of the FET element, a second external connection terminal connected to the source of the FET element and the anode of the diode, and a third external connection terminal connected to the gate of the FET element and the cathode of the diode.

According to one aspect of the present invention, since the FET element for rectification and the diode for reflux are provided inside of one package, it is possible to make an attempt of reducing the size of the device and lowering the cost thereof.

The FET element and the diode may be integrated on the same chip. In this case, the wiring of the gate terminal of the FET element on the printed board is not required. As a consequence, the wiring of the printed board can be simplified and the packaging efficiency thereof can be improved.

According to another aspect of the present invention, a rectifier circuit device may be of a DC/DC converter which has a transformer including a primary side to which a direct current voltage is applied, and a secondary side from which a transformed direct current voltage is output. The DC/DC converter has further a switching element provided on the primary side of the transformer a controlling circuit which controls the switching element, a rectifier circuit device provided on the secondary side of the transformer, a smoothing circuit which smoothes the transformed direct current voltage. The DC/DC converter has further a first positive pole and a first negative pole provided to the secondary side of the transformer, between the first positive and first negative poles a transformed direct current flows. The DC/DC converter has further a second positive pole and a second negative pole provided to the smoothing circuit, each pole being connected to the first positive and first negative poles, respectively.

The rectifier circuit device may comprise an FET element for rectification, a diode for reflux which are integrated on the same chip, a first external connection terminal connected to a drain of the FET element and to the first negative pole, a second external connection terminal connected commonly to a source of the FET element and an anode of the diode and to the second negative pole, and a third external connection terminal connected commonly to a gate of the FET element and a cathode of the diode and to the first positive pole and the second positive pole.

According to another aspect of the present invention, a DC/DC converter may comprise the above-described rectifier circuit device.

According to another aspect of the present invention, a DC/DC converter may comprise a rectifier circuit device having an FET element for rectification and a diode for reflux which are integrated on the same chip. The DC/DC converter may comprise a transformer including a primary side to which a direct current voltage is applied, and a secondary side from which a transformed direct current voltage is output, and a smoothing circuit which smoothes the transformed direct current voltage. The DC/DC converter may comprise a first positive pole and a first negative pole provided to the secondary side of the transformer, between the first positive and first negative poles a transformed direct current flows, and a second positive pole and a second negative pole provided to the smoothing circuit, each pole being connected to the first positive and first negative poles, respectively. The DC/DC converter may comprise a D terminal as an external connection terminal of the rectifier circuit device connected to a drain of the FET element and to the first negative pole, an S terminal as an external connection terminal of the rectifier circuit device connected commonly to a source of the FET element and an anode of the diode inside of one package and to the second negative pole, and a K terminal as an external connection terminal of the rectifier circuit device connected commonly to a gate of the FET element and a cathode of the diode inside of the package and to the first positive pole and the second positive pole.

DESCRIPTION OF THE PREFERRED EMBODIMENTS

Figure 1:
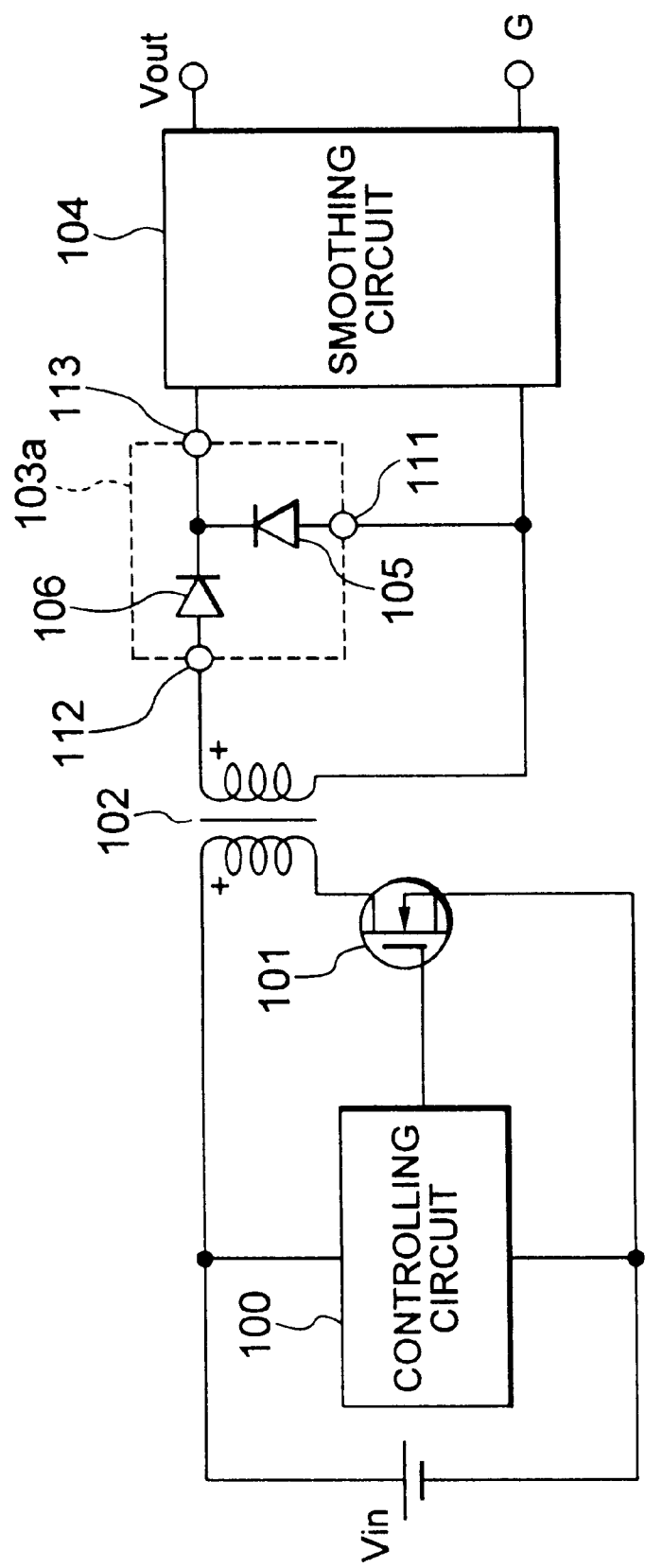
FIG. 1 is a block diagram showing a structure of a conventional DC/DC converter in which a rectifier circuit device is composed only of diodes.
Figure 2:
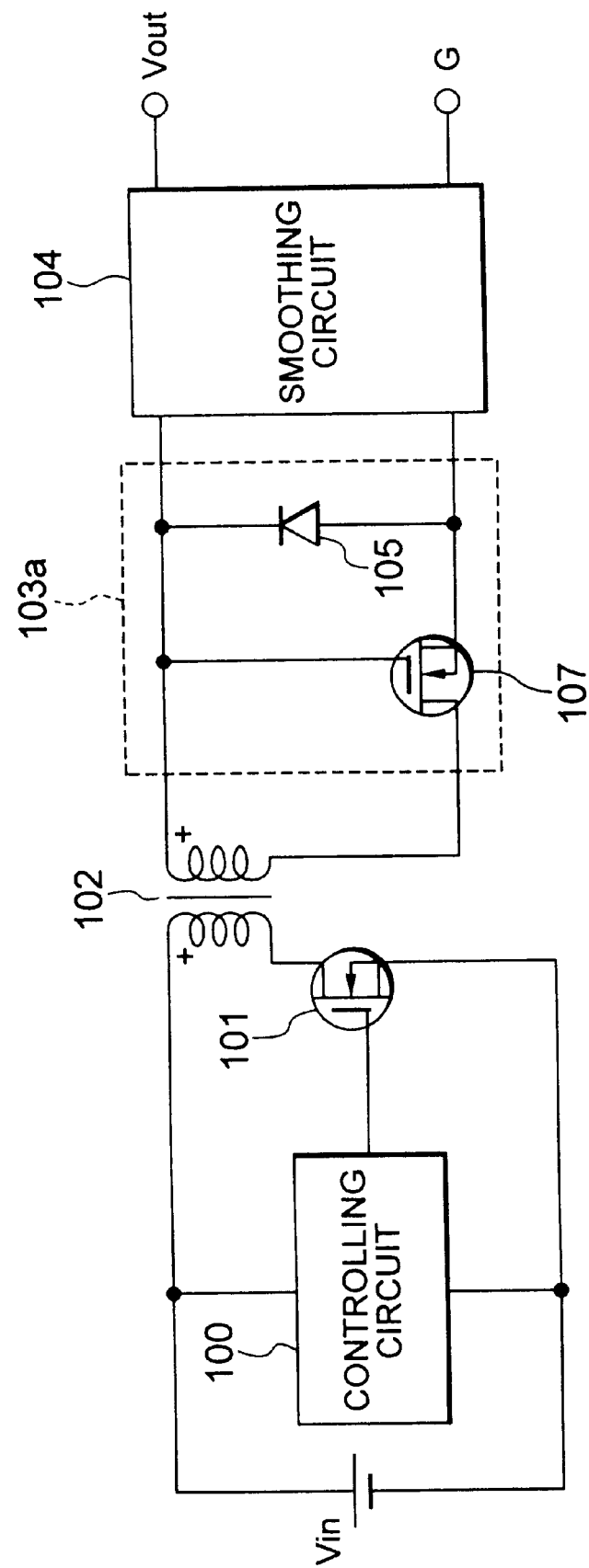
FIG. 2 is a block diagram showing a structure of another conventional DC/DC converter in which a rectifier circuit device is provided with an FET for rectification and a diode for reflux.
Figure 3:
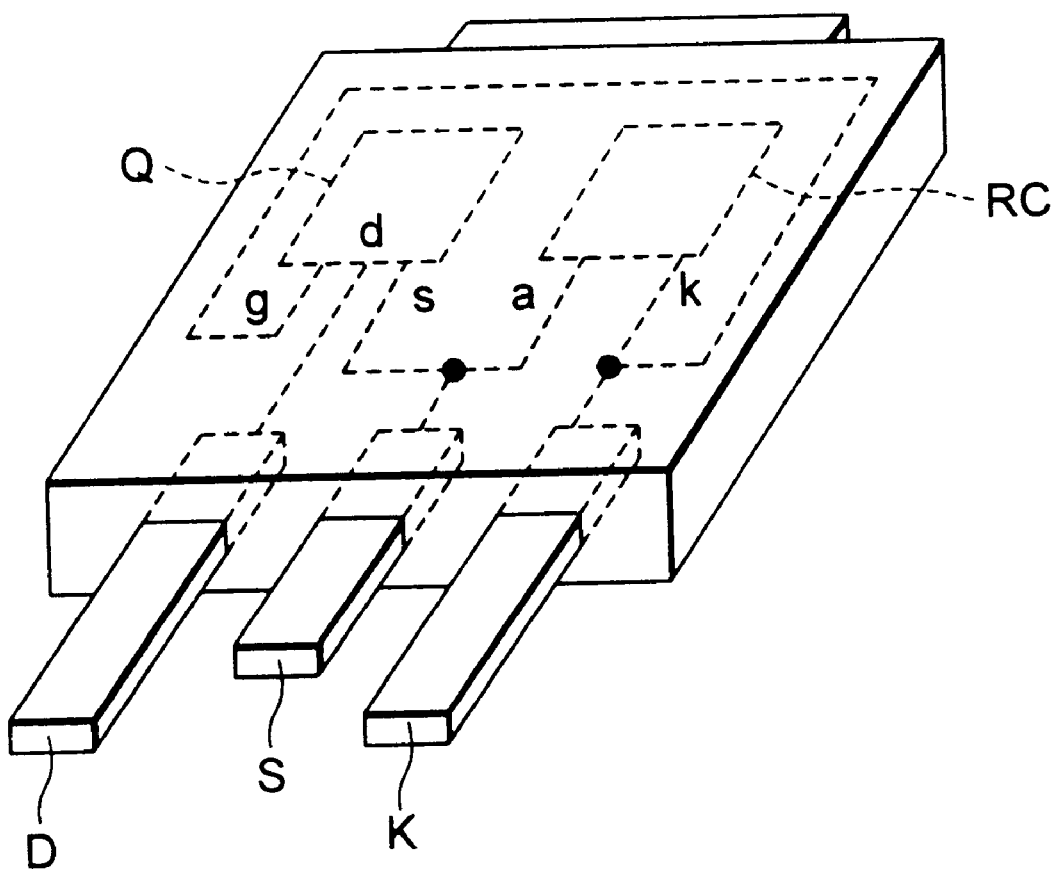
FIG. 3 is a schematic view showing a structure of a rectifier circuit device according to a first embodiment of the present invention.
Figure 4:
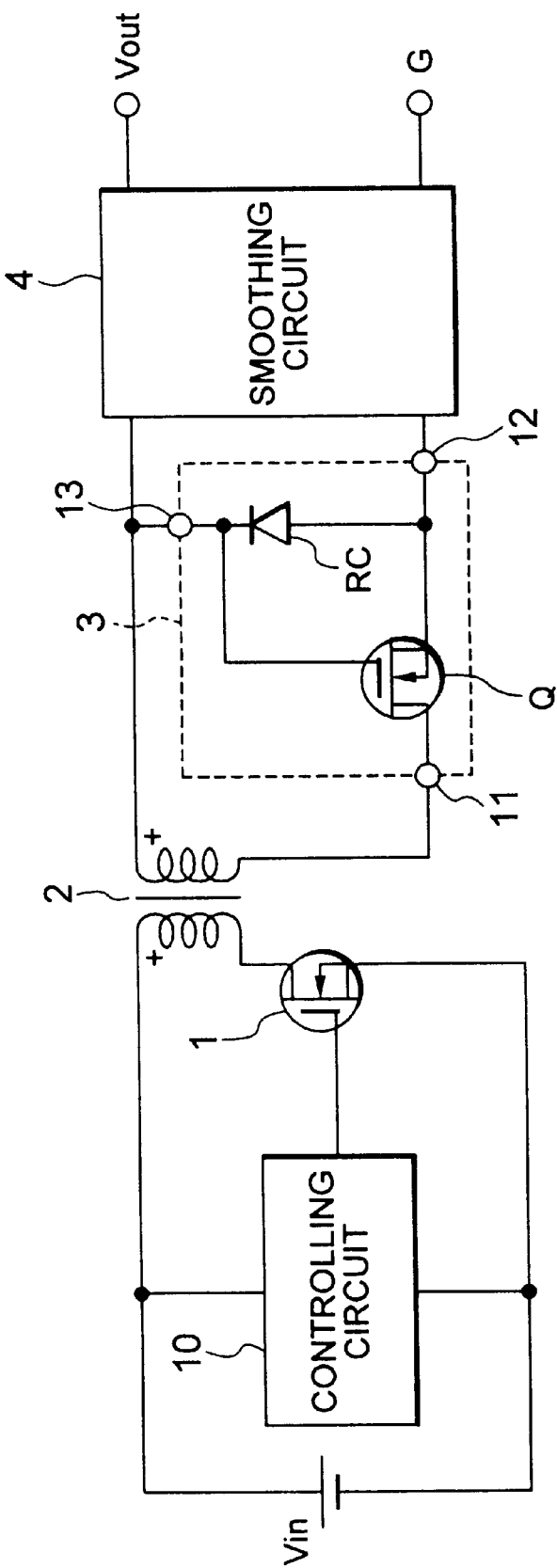
FIG. 4 is a block diagram showing a structure of a DC/DC converter provided with the rectifier circuit device according to the first embodiment of the present invention.

Hereinafter, rectifier circuit devices according to embodiments of the present invention will be specifically explained by referring to the accompanied drawings. FIG. 3 is a schematic view showing a structure of a rectifier circuit device according to a first embodiment of the present invention. FIG. 4 is a block diagram showing a structure of a DC/DC converter provided with the rectifier circuit device according to the first embodiment of the present invention.

A first embodiment is the rectifier circuit device which is applied to, for example, a switching type DC/DC converter having a high frequency transformer, wherein an FET for rectification and a diode for reflux are packaged in one part, and a gate terminal wiring for driving the FET is not required.

In the first embodiment, an FET element Q and a diode element RC are provided, and the configuration of the part is an MP-3 configuration for surface mounting. Furthermore, a drain terminal (a D terminal: a first external connection terminal), a source terminal (an S terminal: a second external connection terminal), and a cathode terminal (a K terminal: a third external connection terminal) are provided as external connection terminals. The drain (d) of the FET element Q is connected to the D terminal. The source (s) of the FET element Q and the anode (a) of the diode RC are connected to the S terminal. The cathode (k) of the diode RC and the gate (g) of the FET element Q are connected to the K terminal. In other words, the source (s) of the FET element Q and the anode (a) of the diode RC are connected to each other, and the cathode (k) of the diode RC and the gate (g) of the FET element Q are connected to each other, inside of the package of the rectifier circuit device.

The rectifier circuit device thus constituted is used in the DC/DC converter in the following manner.

As shown in FIG. 4, the DC/DC converter is provided with a transformer 2. A switching element 1 for supplying input side voltage Vin to the transformer 2 is connected to the primary side of the transformer 2. Furthermore, a controlling circuit 10, which controls the switching element 1, is provided.

A rectifier circuit device 3 according to the first embodiment and a smoothing circuit 4 are connected to the secondary side of the transformer 2. At this time, the K terminal 13 of the rectifier circuit device 3 is connected to the secondary-wiring terminal on the positive pole side of the transformer 2 and the terminal on the positive pole side of the smoothing circuit 4. The D terminal 11 of the rectifier circuit device 3 is connected to the secondary-wiring terminal on the negative pole side of the transformer 2. The S terminal 12 of the rectifier circuit device 3 is connected to the terminal on the negative pole side of the smoothing circuit 4.

In the rectifier circuit device 3 which is connected in this manner, the FET element Q serves as an FET for rectification while the diode RC serves as a diode for reflux.

Furthermore, since the FET element Q for rectification and the diode RC for reflux are incorporated in one package, it is possible to reduce the size and to lower the cost. Furthermore, not only the cathode of the diode RC but also the gate of the FET element Q are connected to the K terminal 13, the gate terminal wiring for driving the FET is not required.

Figure 5:
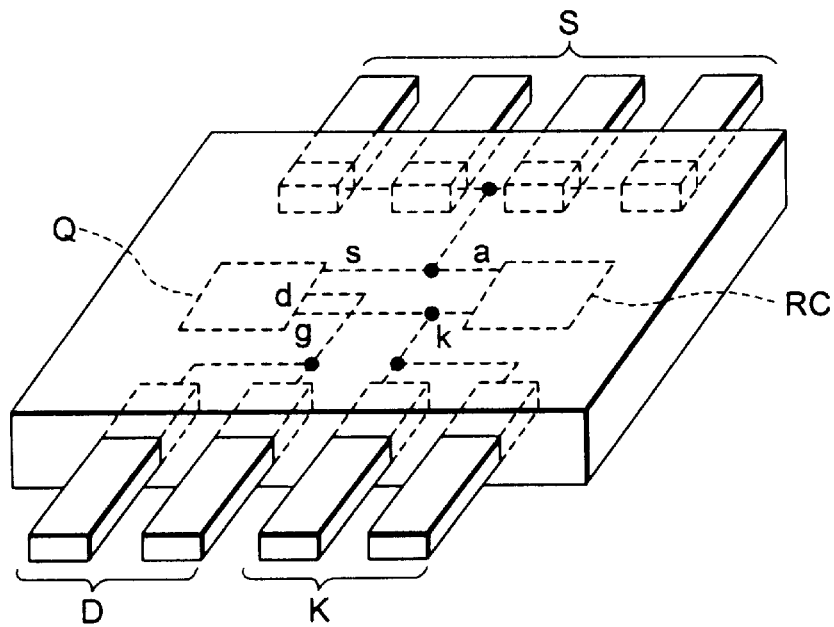
FIG. 5 is a schematic view showing a structure of a rectifier circuit device according to a second embodiment of the present invention.

Next, a second embodiment of the present invention will be explained. In the second embodiment, the configuration of the part is a small outline package (SOP)-8 pin shape. FIG. 5 is a schematic view showing a structure of a rectifier circuit device according to the second embodiment of the present invention. Incidentally, in the second embodiment shown in FIG. 5, the same constitution elements as the first embodiment shown in FIG. 3 are denoted by the same reference numerals, and a detailed explanation thereof will be omitted.

In the second embodiment, two drain terminals (D terminals: first external connection terminals), four source terminals (S terminals: second external connection terminals), and two cathode terminals (K terminals: third external connection terminals) are provided as external connection terminals. The drain (d) of the FET element Q is connected to the D terminals. A connection point between the gate (g) of the FET element Q and the cathode (k) of the diode RC is connected to the K terminals. A connection point between the source (s) of the FET element Q and the anode (a) of the diode RC is connected To the S terminals.

Also, in the second embodiment which is constituted in this manner, since the FET element Q for rectification and the diode RC for reflux are incorporated in one package, it is possible to reduce the size of the device and to lower the cost thereof. Furthermore, since not only the cathode of the diode RC but also the gate of the FET element Q is connected to the K terminals, the gate terminal wiring for driving the FET is not required.

Incidentally, the rectifier circuit device according to the second embodiment is connected to the DC/DC converter in the same manner as the first embodiment, as shown in FIG. 4.

Figure 6:
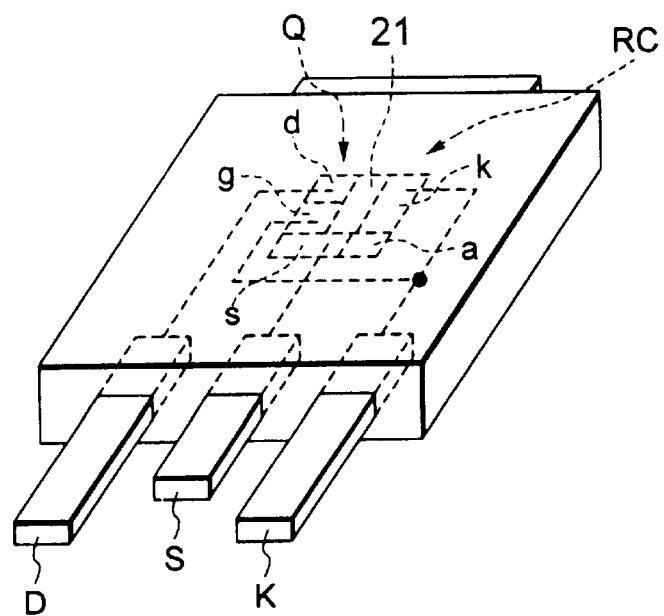
FIG. 6 is a schematic view showing a structure of a rectifier circuit device according to a third embodiment of the present invention.

Next, a third embodiment of the present invention will be explained. The third embodiment is such that an internal circuit including an FET element and a diode is integrated on one chip inside of the package having the MP-3 configuration. FIG. 6 is a schematic view showing a structure of the rectifier circuit device according to the third embodiment of the present invention. Incidentally, in the third embodiment shown in FIG. 6, the same constitution elements as the first embodiment shown in FIG. 3 are denoted by the same reference numerals, and a detailed explanation thereof will be omitted.

The configuration of the part in the third embodiment is the MP-3 configuration in the same manner as the first embodiment. Then, the FET element Q and the diode RC are integrated on one chip. Furthermore, the source (s) of the FET element Q and the anode (a) of the diode RC are directly connected to each other without the wiring. An insulation layer 21 is provided between the drain (d) and the gate (g) of the FET element Q, and the cathode (k) of the diode RC. In other words, the drain (d) and the gate (g) of the FET element Q, and the cathode (k) of the diode RC are located opposite to each other via the insulation layer 21.

In the third embodiment which is constituted in this manner, since the wiring which connects the source (s) of the FET element Q and the anode (a) of the diode RC is not required, the size of the rectifier circuit device may be further reduced.

Incidentally, in FIG. 6, the gate (g), the drain (d) and the source (s) are contacted to each other. However, in actuality, the gate (g) is insulated from the drain (d) and the source (s) with a gate insulation film (not shown).

Figure 7:
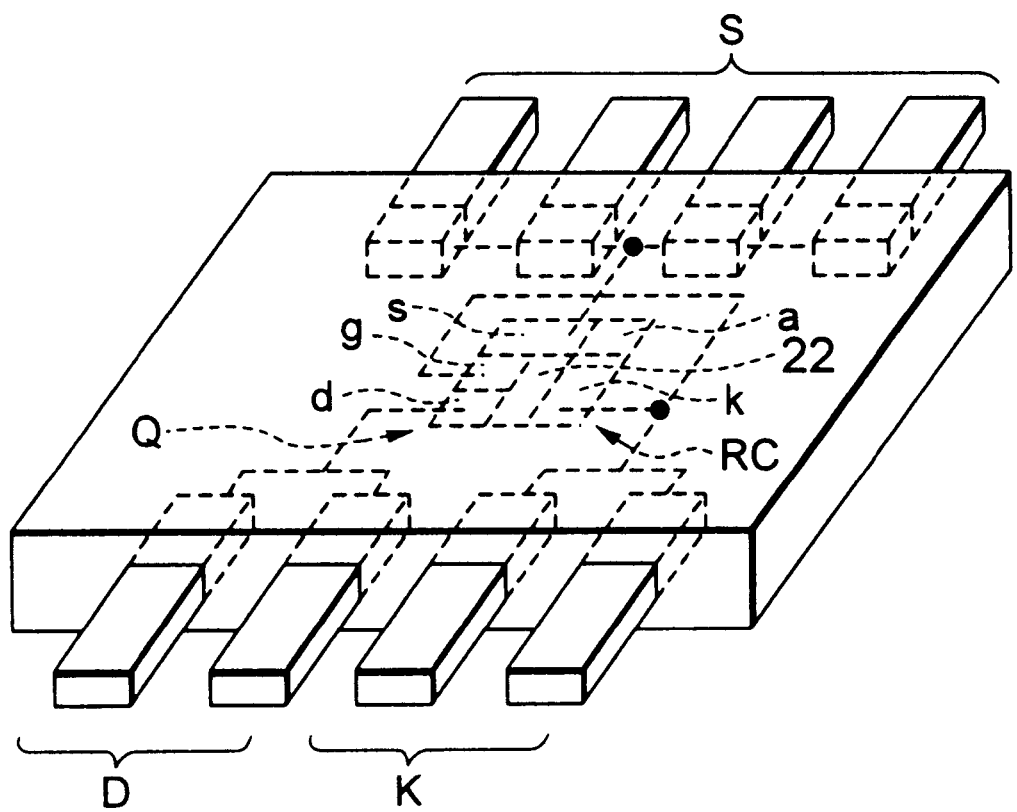
FIG. 7 is a schematic view showing a structure of a rectifier circuit device according to a fourth embodiment of the present invention.

Next, a fourth embodiment of the present invention will be explained. The fourth embodiment is configured such that an internal circuit including the FET element and the diode are integrated on one chip inside of the package having the SOP-8 pin shape. FIG. 7 is a schematic view showing a structure of a rectifier circuit device according to the fourth embodiment of the present invention. Incidentally, in the fourth embodiment shown in FIG. 7, the same constitution elements as the second embodiment shown in FIG. 5 are denoted by the same reference numerals, and a detailed explanation thereof will be omitted.

The configuration of the part in the fourth embodiment is the SOP-8 pin shape in the same manner as the second embodiment. Then, the FET element Q and the diode RC are integrated on one chip. Furthermore, the source (s) of the FET element Q and the anode (a) of the diode are directly connected to each other without wiring. An insulation layer 22 is provided between the drain (d) and the gate (g) of the FET element Q, and the cathode (k) of the diode RC. In other words, the drain (d) and the gate (g) of the FET element Q, and the cathode (k) of the diode RC are located opposite to each other via the insulation layer 22.

Also, in the fourth embodiment which is constituted in this manner, since wiring is not required which connects the source (s) of the FET element Q and the anode (a) of the diode RC, the size of the rectifier circuit device may be further reduced.

Incidentally, in FIG. 7, since the gate (g), the drain (d) and the source (s) are connected to each other. However, the gate (g) is insulated from the drain (d) and the source (s) with the gate insulation film (not shown).

In the case where the rectifier circuit devices according to the second to the fourth embodiment are applied in the DC/DC converter shown in FIG. 5, the same effect as the first embodiment can be obtained.

What is claimed is:

1. A rectifier circuit device comprising:
   a package;
   an FET element for rectification which is provided inside of said package;
   a diode for reflux which is provided inside of said package;
   a first external connection terminal connected to a drain of said FET element;
   a second external connection terminal connected to a source of said FET element and an anode of said diode; and
   a third external connection terminal connected to a gate of the FET element and a cathode of the diode.

2. The rectifier circuit device according to claim 1, wherein said FET element and said diode are integrated on the same chip.

3. The rectifier circuit device according to claim 1, wherein said package is a surface-mounted type package.

4. The rectifier circuit device according to claim 1, wherein said package is a small outline package.

5. The rectifier circuit device according to claim 1, wherein
   said rectifier circuit is incorporated in a DC/DC converter, said DC/DC converter having:
      a transformer including a primary side to which a direct current voltage is applied, and a secondary side from which a transformed direct current voltage is output;
      a first positive pole and a first negative pole provided to said secondary side of said transformer, between said first positive and first negative poles a transformed direct current flows;
      a smoothing circuit which smoothes said transformed direct current voltage; and
      a second positive pole and a second negative pole provided to said smoothing circuit, each pole being connected to said first positive and first negative poles, respectively,
   said first external connection terminal is connected to said first negative pole,
   said second external connection terminal is connected to said second negative pole, and
   said third external connection terminal is connected to said first positive pole and said second positive pole.

6. The rectifier circuit device according to claim 5, wherein said DC/DC converter has
   a switching element connected to said primary side of said transformer, and
   a controlling circuit which controls said switching element.

7. A DC/DC converter comprising:
   a rectifier circuit device according to claim 1.

8. The DC/DC converter according to claim 7, wherein said FET element and said diode are integrated on the same chip.

9. The DC/DC converter according to claim 7, wherein said package is a surface-mounted type package.

10. The DC/DC converter according to claim 7, wherein said package is a small outline package.

11. The DC/DC converter according to claim 7, which further comprising:
    a transformer including a primary side to which a direct current voltage is applied, and a secondary side from which a transformed direct current voltage is output;
    a first positive pole and a first negative pole provided to said secondary side of said transformer, between said first positive and first negative poles a transformed direct current flows;
    a smoothing circuit which smoothes said transformed direct current voltage; and
    a second positive pole and a second negative pole provided to said smoothing circuit, each pole being connected to said first positive and first negative poles, respectively, and wherein
       said first external connection terminal is connected to said first negative pole,
       said second external connection terminal is connected to said second negative pole, and
       said third external connection terminal is connected to said first positive pole and said second positive pole.

12. A rectifier circuit device of a DC/DC converter which has:
    a transformer including a primary side to which a direct current voltage is applied, and a secondary side from which a transformed direct current voltage is output;
    a switching element provided on said primary side of said transformer;
    a controlling circuit which controls said switching element;
    a rectifier circuit device provided on said secondary side of said transformer;
    a smoothing circuit which smoothes said transformed direct current voltage;
    a first positive pole and a first negative pole provided to said secondary side of said transformer, between said first positive and first negative poles a transformed direct current flows; and
    a second positive pole and a second negative pole provided to said smoothing circuit, each pole being connected to said first positive and first negative poles, respectively; comprising:
       an FET element for rectification;
       a diode for reflux which are integrated on the same chip;
       a first external connection terminal connected to a drain of said FET element and to said first negative pole;
       a second external connection terminal connected commonly to a source of said FET element and an anode of said diode and to said second negative pole; and a third external connection terminal connected commonly to a gate of said FET element and a cathode of said diode and to said first positive pole and said second positive pole.

13. A DC/DC converter comprising:

a rectifier circuit device having an FET element for rectification and a diode for reflux which are integrated on the same chip;

a transformer including a primary side to which a direct current voltage is applied, and a secondary side from which a transformed direct current voltage is output;

a smoothing circuit which smoothes said transformed direct current voltage;

a first positive pole and a first negative pole provided to said secondary side of said transformer, between said first positive and first negative poles a transformed direct current flows;

a second positive pole and a second negative pole provided to said smoothing circuit, each pole being connected to said first positive and first negative poles, respectively;

a D terminal as an external connection terminal of said rectifier circuit device connected to a drain of said FET element and to said first negative pole;

an S terminal as an external connection terminal of said rectifier circuit device connected commonly to a source of said FET element and an anode of said diode inside of one package and to said second negative pole; and a K terminal as an external connection terminal of said rectifier circuit device connected commonly to a gate of said FET element and a cathode of said diode inside of said package and to said first positive pole and said second positive pole.

* * * * *